May 27, 1930.                J. HOWARD                1,759,848
METHOD OF MAKING TIRE CASINGS
Filed May 16, 1927

Inventor
J. Howard
by: E. J. Fetherstonhaugh
Attorney

Patented May 27, 1930

1,759,848

UNITED STATES PATENT OFFICE

JOHN HOWARD, OF MONTREAL, QUEBEC, CANADA, ASSIGNOR, BY DIRECT AND MESNE ASSIGNMENTS, OF THREE-EIGHTHS TO SIGMUND GREENBERG, AND ONE-EIGHTH TO WILLIAM GOODMAN AND MAX S. WOLFSON, ALL OF NEW YORK, N. Y.

METHOD OF MAKING TIRE CASINGS

Application filed May 16, 1927. Serial No. 191,802.

The invention relates to a tire casing and the method of making the same and the objects of the invention are to reinforce the exposed wall surface in a manner that will effectually form a barrier to the penetration of the casing by nails, glass or other sharp material picked up on the road or in the garage or shop and thereby save the inner air tube from punctures or tears; to eliminate blow-outs due to the deflation of the air tube and collapse of the casing or to the contact with sharp obstacles on the roadway; to insure economy in the maintenance of tires for many kinds of vehicles and particularly for motor cars used in pleasure and business pursuits; to eliminate the delays and inconveniences incident to the changing and repairing of tires, which have been damaged during a trip thus enabling motorists to depend confidently on the performance of their cars; and generally to provide a durable, efficient and economical tire casing or casing section.

The drawings illustrate the method of assembling and treating the several novel parts, which consist essentially of an animal material treated for waterproofing purposes and for stiffening and built up to form a composite solid wall adapted to fit to a wheel rim and enclose a pneumatic tube or other filling substance, the invention being clearly pointed out in the broad and specific claims for novelty following a description of a preferred form of the invention.

Like numerals of reference indicate corresponding parts in the various figures.

Figure 4:
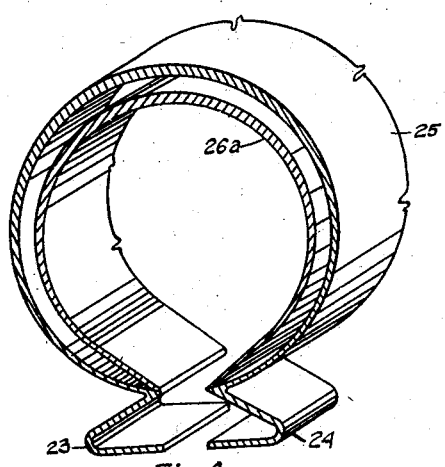
Figure 4 illustrates the inner and outer main layers forming reinforcing supports.
Figure 1:
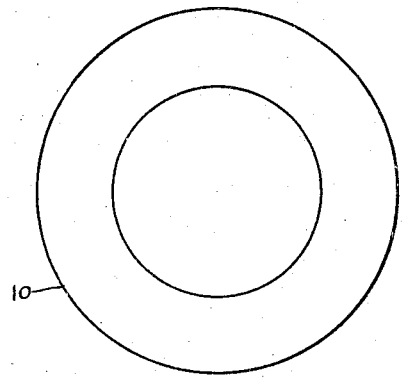
Figure 1 shows the blank cut from the hide.
Figure 2:
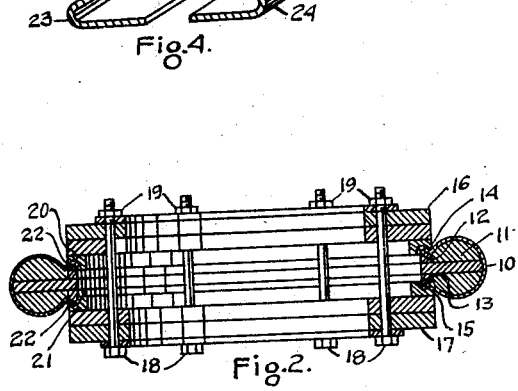
Figure 2 shows this blank stretched on a circular forming bar and rigidly clamped thereto.
Figure 3:
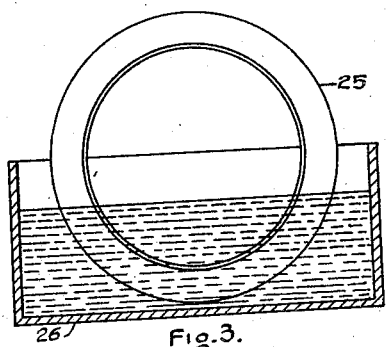
Figure 3 is a view showing the casing in a semi-dry condition being passed through a bath containing a filler in liquid form and adapted to become consistent on exposure.
Figure 5:
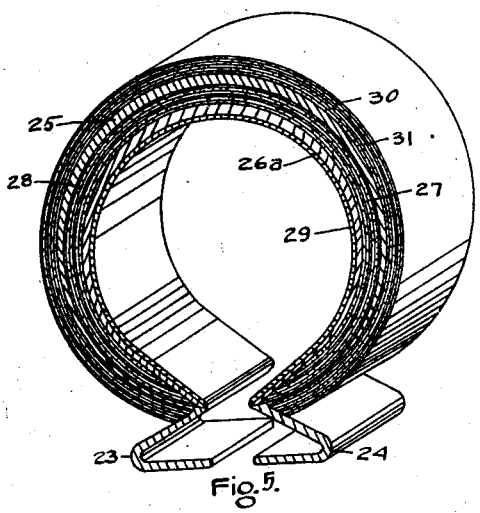
Figure 5 illustrates the next condition of the reinforcing supports with the fabric or cotton layers applied thereto in beds of cementitious material.
Figure 6:
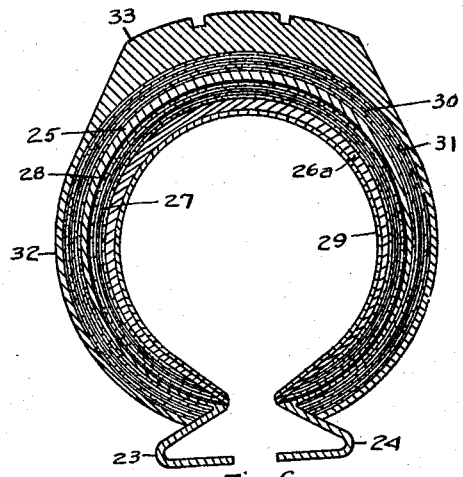
Figure 6 illustrates the finished composite wall with the rubber facing applied on the outer exposed surface.

The first step in carrying out this method is to cut the blank from a hide and in this connection scotch-crop has been found particularly suitable for the purposes of this invention.

The hide blank indicated by the numeral 10 is in a raw moist condition and so is stretched around a circular forming bar 11 having the circular flanges 12 and 13 jutting from the inner wall of the bar and forming base surfaces 14 and 15 around which the hide is stretched and held by the clamps 16 and 17. The clamps 16 and 17 are in disc form and are held by the bolts 18 and nuts 19 and these discs in turn hold the forming rings 20 and 21 firmly on the hide 10 over the projecting ends 22 of the flanges 12 and 13, thus shaping the rim grips 23 and 24 terminating transversely at the inner wall ends of the casing.

The hide 10 is now exposed to the atmosphere or to a warm blast or enclosed in a heated chamber, so as to remove the free water, which immediately effects a slight stiffening of the hide quite sufficient for it to take its final shape and remain so formed but only semi-dry, and quite moist enough to leave the pores free and open.

The hide shield 25 thus formed from the blank 10 is then rotated in a bath 26 containing a solution of viscous or other penetrating substance, which enters the pores of the hide and fills said pores, so that the hide shield when completely dry has all the pores stopped by this filler, which meanwhile has become consistent to further stiffen the hide and make it impervious to moisture.

Another hide shield 26ª is formed on a forming bar and made without the rim grips and of slightly smaller dimensions in order to fit within the shield 25.

The layers of cotton 27 preferably six in number are imbedded in the cementitious substance 28 and are thus secured to the outer wall surface of the inner hide, shield 26ª and a lining 29 cemented to the inner wall surface of the same hide shield.

This inner hide shield 26ª is then introduced into the outer hide shield 25 and adheres thereto through the cementitious substance 28.

The layers of cotton 30 are then laid in a cementitious substance 31 on the outer wall surface of the hide shield 25 and a facing 32 of rubber applied by molding operations on the cotton layers 30 forming the rubber tread 33. The tire casing is now vulcanized by a steaming process and the wall thereof made into a composite casing of rubber, fabric, hide and cement, through which moisture cannot pass and which is substantially impenetrable to sharp instruments of all kinds.

The drawing and description are made to show and set forth a complete tire casing but it must be understood that short sections thereof may be used for effecting temporary repairs on the road to carry on until the first service station is reached.

What I claim is:—

1. The herein described method of making a tire casing, consisting in forming the moist hide into an endless casing having outturned rim flanges from the inner wall portions and partially drying, then stiffening and reinforcing the hide by the introduction into the pores of a filling and closing substance adapted to harden, coincidently with the final drying out of the hide, then forming a tire protector of hide surfaced with cotton and cementitious material and lined and introducing said protector into said endless casing, and finally surfacing the outer casing with cotton and cementitious material and a rubber tread covering suitably vulcanized and finally lining and surfacing.

2. The herein described method of making a tire casing, consisting in forming the moist hide into an endless casing, having outturned rim flanges from the inner wall portions and partially drying, then stiffening and reinforcing the hide by the introduction into the pores of a filling and closing substance adapted to harden coincidently with the final drying out of the hide, and finally lining and surfacing.

Signed at Montreal, Canada, this 25th day of April, 1927.

JOHN HOWARD.